(12) United States Patent
Nguyen

(10) Patent No.: US 6,680,906 B1
(45) Date of Patent: Jan. 20, 2004

(54) REGULATING PACKET TRAFFIC IN AN INTEGRATED SERVICES NETWORK

(75) Inventor: Khanh Vinh Nguyen, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/283,117

(22) Filed: Mar. 31, 1999

(51) Int. Cl.[7] .......................... G01R 31/08; H04L 12/28; H04J 3/16
(52) U.S. Cl. .................... 370/229; 370/230.1; 370/412; 370/468
(58) Field of Search ................................. 570/229, 230, 570/230.1, 232, 235, 236, 235.1, 244, 394, 392, 351, 395.4, 395.42, 401, 410, 415, 412, 416, 408, 400, 477; 710/56, 60; 709/238, 242

(56) References Cited

U.S. PATENT DOCUMENTS

| | | | |
|---|---|---|---|
| 4,769,810 A | 9/1988 | Eckberg, Jr. et al. | 370/60 |
| 4,769,811 A | 9/1988 | Eckberg, Jr. et al. | 370/60 |
| 4,914,650 A | 4/1990 | Sriram | 370/60 |
| 4,953,157 A | 8/1990 | Franklin et al. | 370/60 |
| 4,979,165 A | 12/1990 | Dighe et al. | 370/60 |
| 5,278,828 A * | 1/1994 | Chao | 370/85.6 |
| 5,291,481 A | 3/1994 | Doshi et al. | 370/60 |
| 5,793,978 A | 8/1998 | Fowler | 395/200.56 |
| 5,983,278 A * | 11/1999 | Chong et al. | 709/235 |
| 6,091,709 A * | 7/2000 | Harrison et al. | 370/235 |
| 6,252,848 B1 * | 6/2001 | Skirmont | 370/229 |
| 6,408,006 B1 * | 6/2002 | Wolff | 370/412 |

OTHER PUBLICATIONS

Clark, D., et al., "An Approach to Service Allocation in the Internet", http://diffserv.lcs.mit.edu/Drafts/draft–clark–diff–svc–alloc–00.txt, Jul., 1997.

Nichols, K., et al., "A Two–bit Differentiated Services Architecture for the Internet," http://search.ietf.org/internet-drafts/draft–nichols–diff–svc–arch–00.txt.

Steven B, et al., An Architecture for Differentiated Services <draft–ietf–diffserv–arch–02.txt>, http://search.ietf.org/internet–drafts/draft–ietf–diffserv–arch–02.txt, Oct.

* cited by examiner

*Primary Examiner*—Duc Ho
(74) *Attorney, Agent, or Firm*—Hickman Palermo Truong & Becker LLP

(57) ABSTRACT

Methods and mechanisms for regulating network packet traffic in an integrated services network, by selectively dropping packets of particular traffic, are described. Packets of network traffic arriving at an input port of a router or switch are selectively copied to one of two queues according to the type of transmission (voice, video, data) represented by the packets. A first queue receives traffic requiring guaranteed bandwidth and the second queue receives traffic requiring guaranteed minimum delay. Data in the packets indicates when the packet should be dropped relative to other packets in a packet stream. The process of marking packets with data used to indicate a drop order is referred to herein as marking packets. A network device that receives marked packets, for example, a router, may drop some of packets according to a drop policy based on the values used to mark the packets.

42 Claims, 8 Drawing Sheets

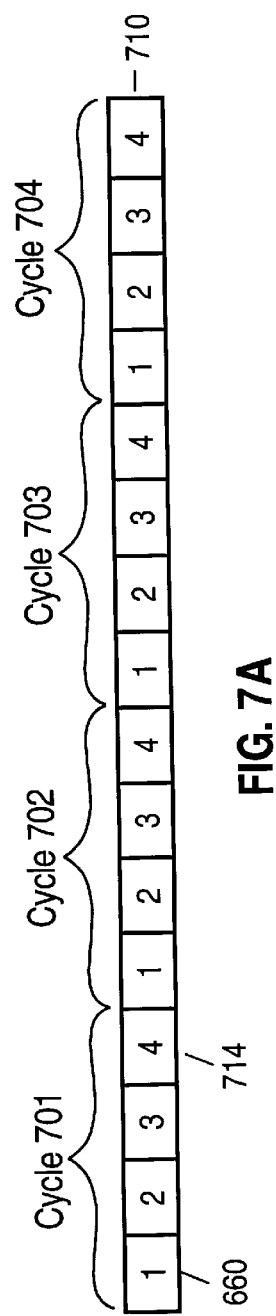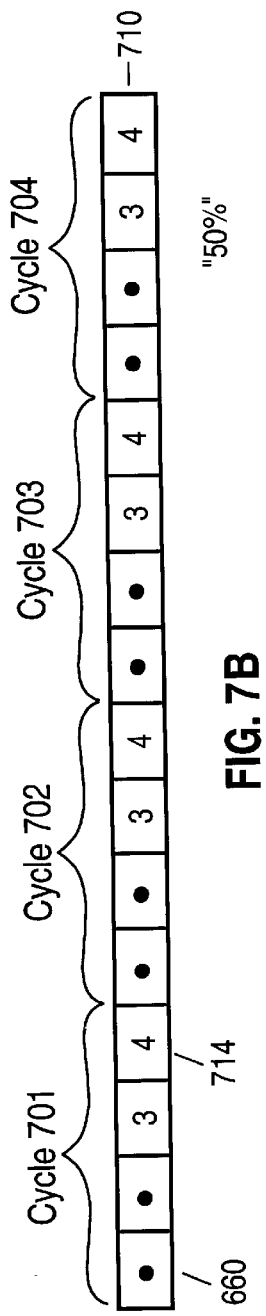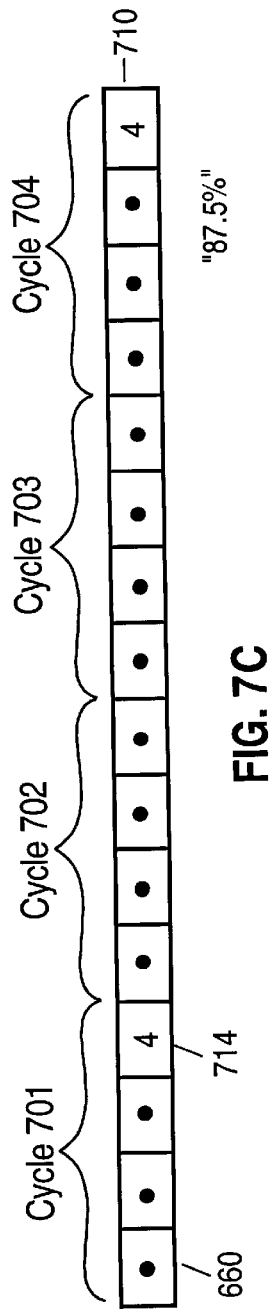

REGULATING PACKET TRAFFIC IN AN INTEGRATED SERVICES NETWORK

FIELD OF THE INVENTION

The present invention generally relates to managing the transmission of data packets in a packet-switched network. The invention relates more specifically to managing the dropping of packets in a packet stream of an integrated network that carries data, voice, video, and other traffic.

BACKGROUND OF THE INVENTION

Demand for voice and video digital services is increasing. To meet this increasing demand in an efficient and cost-effective manner, voice and video data may be transmitted over a packet-switched network that handles other types of network transmissions, in addition to the voice and video transmissions.

Such networks are required to handle, simultaneously, different kinds of network transmissions ("traffic") that may have different requirements. A key requirement is providing adequate quality of service ("QoS") for each type of traffic.

Transmission of voice and video data are examples of real-time transmission. Real-time transmissions require relatively little delay, and are characterized by high but relatively predictable bandwidth utilization. Data traffic, in contrast, is more tolerant to delay, but tends to arrive in unpredictable bursts of high bandwidth. In a network element that handles both types of traffic, such as a router or switch, to provide adequate QoS, it is important to guarantee small, consistent delays for real-time transmissions without starving the data traffic.

A conventional method of handling real-time transmission is the "reservation" method. Under the reservation method, bandwidth requirements for a transmission are reserved for the entire duration of the transmission along the entire transmission path, from the transmitter to the receiver. Unallocated portion of bandwidth is used for non-real-time transmissions. A drawback to the allocation method is that the network elements that participate in the real-time transmission must be coordinated. This coordination entails handshaking between the participating network elements, resulting in overhead and delay in initiating the transmission.

An approach which eliminates the need to allocate is the differentiation approach (Diff Serv). Under the differentiation approach, each network element in a network may handle different types of network transmissions differently, processing each type according to its needs. However, a drawback of the DiffServ approach is that it only solves the problem of bandwidth contentions among different traffic types or classes, and overlooks contentions among traffic streams of the same classes and/or among packets of the same stream. As a result, DiffServ approaches tend to implement a sub-optimal drop policy for real-time traffic.

In this context, "drop" means that a packet is not processed by the network element, and not transmitted along the remainder of the transmission path. Some types of real-time traffic tolerate dropped packets relatively well. For example, the quality of a voice data transmission does not significantly deteriorate when only a few packets are intermittently lost. However, when sets of adjacent packets ("gaps") are dropped, the quality of a voice transmission diminishes significantly. Under heavy traffic conditions, the size and number of gaps are more likely to increase, significantly diminishing the quality of a voice transmission.

U.S. Pat. No. 4,979,165 (Dighe et al.) describes a multiple queue bandwidth packet reservation system for networks that use fixed-length packets, for example, packets in a voice network. This approach cannot be used in systems that use variable length packets, such as Internet Protocol data networks.

U.S. Pat. No. 5,291,481 (Doshi et al.) describes a congestion control method for high speed packet networks, which requires bandwidth reservation for individual voice calls. This approach requires a circuit-switched network, and is unsuitable for packet-switched networks that transmit integrated traffic.

U.S. Pat. No. 5,793,978 (Fowler) (commonly assigned with this patent application) describes a system for routing packets by separating packets into broadcast packets and non-broadcast packets and allocating a selected communication bandwidth to the broadcast packets. This approach is limited to the use of broadcast packets and non-broadcast packets. It is not intended for, or applicable to, integrated voice/data traffic.

U.S. Pat. No. 4,914,650 (Sriram) describes a bandwidth allocation and congestion control scheme. This approach uses multiple packet queues and applies a time slot scheme for selecting packets to be serviced.

The Diffserv Working Group of the Internet Engineering Task Force is developing standards and architectures for providing differentiated services in the Internet. For example, D. Clark et al., "An approach to service allocation in the Internet," Internet-draft, July 1997, describes a scheme of classifying packets into different service profiles, which are used to select packet drop preference policies at a network node. The dropping mechanism has a single queue with selective dropping.

K. Nichols et al., "A two-bit differentiated service architecture for the Internet," Internet-draft, November 1997, combines the approach of Clark et al. with a proposal for a "premium service." The "premium service" proposal implements a guaranteed peak bandwidth service with negligible delay.

S. Blake et al., "An architecture for differentiated services," Internet-draft, August 1998, presents an architectural proposal for traffic profiles, and formally defines traffic conditioners.

The common drawback of Clark, Nichols, Blake, Sriram, and the other patents cited above, is that their approaches do not specifically exploit the redundant characteristics of voice and video signals and thus do not have an optimal drop policy for voice and video traffics. At the same packet drop rate, the quality of a voice or video transmission can vary greatly depending on how the packets within each stream are dropped. For example, dropping packets consecutively in large chunks or spreading drops out evenly will significantly affect quality. The prior solutions, one way or another, focus only on the contentions for bandwidth among multiple traffic classes.

Thus, there is a need for a mechanism that deals with both the contentions among traffic classes (using multiple queues) and the contentions among packets belonging to a same traffic class/stream (using sequence numbers). The end result is a better voice/video quality during periods of network congestion.

Based on the foregoing, it is desirable to provide a method for regulating packet traffic in a manner that minimizes loss of quality of the traffic.

In particular, there is a need for a fast, reliable, simple method of ensuring consistent quality of service for network transmissions of different types.

There is a need for such a method that guarantees high quality of service for real-time traffic, without starving data traffic of bandwidth.

SUMMARY OF THE INVENTION

The foregoing needs and objects, and other needs and objects that will become apparent from the following description, are achieved by the present invention, which comprises, in one aspect, a method of managing traffic directed from a first network element to a second network element in a packet-switched network, comprising the steps of receiving, from the first network element, a plurality of packets each including a drop priority value that indicates an order to drop the packet relative to other packets among the plurality of packets; storing the plurality of packets in a queue; detecting a drop condition, and in response thereto: selecting one or more packets of said plurality of packets based on said drop priority field, and dropping the selected packets from the queue while transmitting to the second network element all other packets of said plurality of packets.

According to one feature, the step of selecting includes selecting a first packet that is received after at least one other packet from said plurality of packets. In another feature, the step of receiving includes receiving a plurality of packets that includes a first subset of packets that each include a drop priority field set to a first drop value of a set of drop values and a second subset of packets that each include a drop priority field set to a second drop value of said set of drop values. A related feature is that the step of selecting includes selecting all packets from said first subset before selecting packets from said second subset.

In another related feature, the step of receiving a plurality of packets includes assigning the first drop values and the second drop values according to a pre-determined ratio. In yet another related feature, the step of receiving includes receiving a plurality of packets each having drop priority field values that form a sequence of consecutively greater integers.

Still another feature is that the step of selecting one or more packets comprises selecting only an earlier received packet that has a particular drop priority field value. According to yet another feature, the step of storing includes storing said plurality of packets in a first set of one or more first queues, and further comprising the step of storing a second plurality of packets in a second set of one or more second queues. Another feature is that the step of storing includes storing said plurality of packets either in a first set of one or more first queues, or in a second plurality of packets in a second set of one or more second queues, according to a type of traffic represented by the plurality of packets. A related feature is that the step of storing includes storing said plurality of packets in a queue selected from among a plurality of queues according to a type of data contained in each packet of said plurality of packets.

According to a further feature, the step of storing includes the step of storing said plurality of packets in a queue selected from among a plurality of queues according to a type of data contained in each packet of said plurality of packets; and storing packets containing voice traffic in a first queue of the plurality of queues and storing data traffic in a second queue of the plurality of queues.

The invention also encompasses many other aspects and features, as described in the following description and in the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7A is a block diagram showing a packet stream used to illustrate a marking scheme; and FIG. 7B is a block diagram showing a packet stream used to illustrate a marking scheme; and FIG. 7C is a block diagram showing a packet stream used to illustrate a marking scheme.

DETAILED DESCRIPTION OF THE PREFERRED EMBODIMENT

Figure 1:
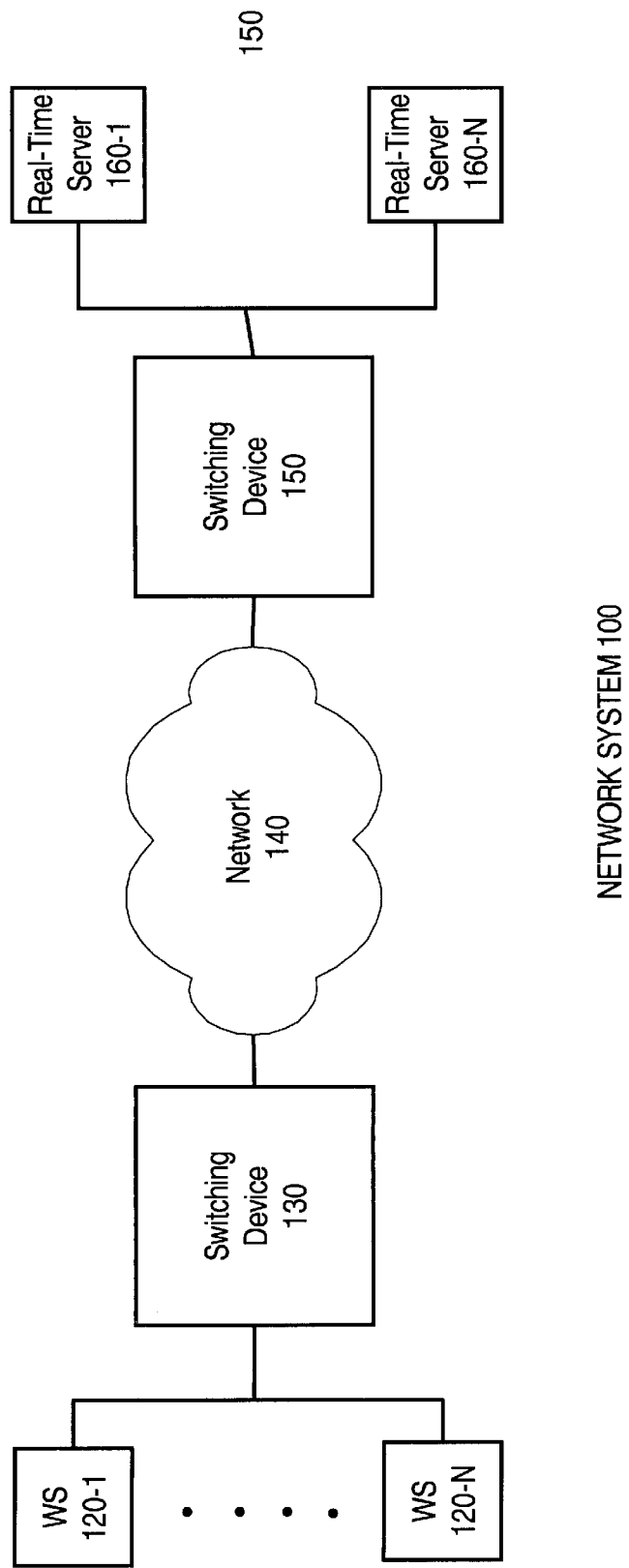
FIG. 1 is a diagram depicting a network architecture.

A method and apparatus for regulating packet traffic in an integrated services network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OVERVIEW

Techniques for regulating packet traffic in an integrated services network by separation of traffic using multiple queues and selectively dropping packets are described.

A first technique involves a traffic regulator using two bandwidth partitions or queues, which provides a way to separate data traffic from real-time traffic such as video or voice transmissions. This technique prevents bursts in data traffic from impacting the quality of voice or video data streams, without starving the data traffic of necessary bandwidth.

Using this technique, network bandwidth may be separated into a first partition for voice traffic having predictable bandwidth, and a second partition for bursty data traffic. Partitioning is accomplished using a regulatory device. The device may include two or more queues and a processor. Incoming voice packets are stored in the first queue and data packets are stored in the second queue. The processor monitors the throughput of each queue and regulates the throughput by arbitrating the selection of the next packet to be serviced from the queues. During congestion, each queue operates only within its allocated bandwidth.

A second technique involves a packet drop sequence or scheme that acts as a second line of defense of quality of real-time traffic. Even when bandwidth is reserved and when real-time traffic is separated from data traffic, real-time traffic may suffer from its own congestion problems. There can be many streams of real-time traffic, and their total bandwidth usage may occasionally exceed the shared allocated bandwidth for real-time traffic. The drop sequence scheme ensures that if this type of congestion occurs, the quality of the real-time traffics will degrade gradually. Thus, this technique may improve the quality of certain types of packet streams by spreading the dropping of packets more evenly in a packet stream. A more uniform drop pattern may improve the quality of, for example, some types of real-time packets, such as video and voice digital transmissions.

Data in the packets indicates when the packet should be dropped relative to other packets in a packet stream. Packets may be marked with data used to indicate a drop order. A network device that receives marked packets, for example, a router, may drop some of the packets according to a drop policy based on the data values used to mark the packets.

The regulatory devices may be placed at network switching nodes or links. In this configuration, a portion of the network's total bandwidth is effectively allocated for voice traffic and is isolated from bursts of data traffic. Because voice traffic bandwidth is relatively predictable, the use of bandwidth allocation helps guarantee rate of delay and rate of packet loss, and therefore service quality, for the voice traffic.

OPERATIONAL CONTEXT

FIG. 1 depicts the architecture of an exemplary packet based network system 100 upon which an embodiment of the present invention may be implemented. Work stations 120 are connected to switching device 130, which is coupled to network 140. Network 140 is connected to switching device 150, which is connected to one or more real-time servers 160.

Real-time servers 160 may generate or receive real-time transmissions, such as streams of video or voice packets ("real-time data"), and transmit or receive the real-time data to or from one of the work stations 120. The real-time data may be transmitted in the form of packets via a transmission path that connects switching device 150, network 140, and switching device 130. Work stations 120 and real-time servers 160 may also receive and send non-real-time traffic, such as data transported using the Hypertext Transport Protocol (HTTP) or File Transport Protocol (FTP).

Work stations 120 may be personal computers, workstations, or other network end stations at which useful work is done, such as printers. Switching device 150 may be a router, switch, gateway, or the equivalent. Real-time servers may be protocol converters, call switches, streaming video servers, etc.

Figure 2:
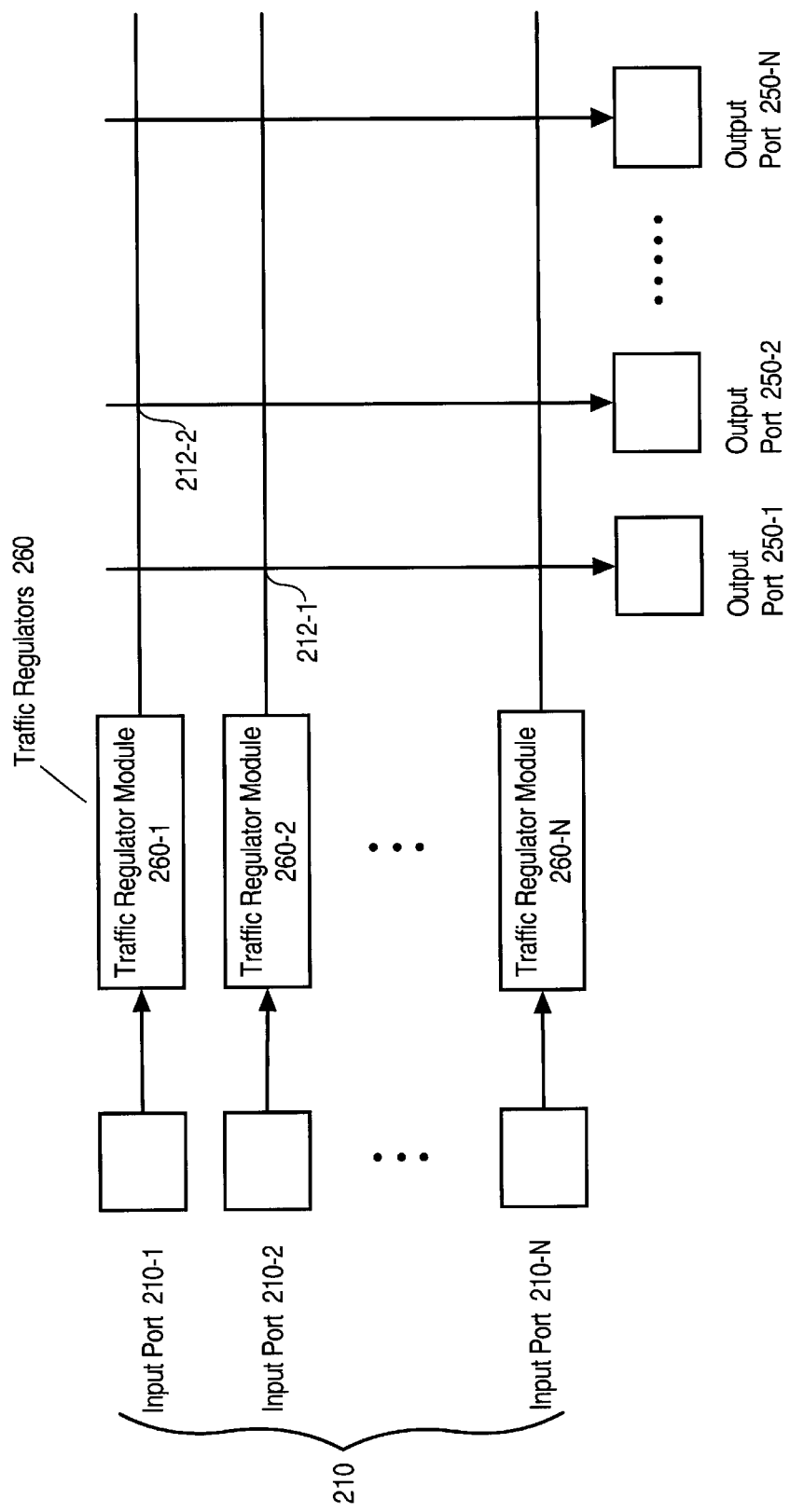
FIG. 2 is a diagram depicting an exemplary switching device.

FIG. 2 shows an exemplary switching device 130 in more detail. Switching device 130 may be any network device that switches packets, such as a router or a gateway.

Generally, switching device 130 has a crossbar switch architecture. Switching device 130 includes input ports 210, that is input ports 210-1 through 210-N, and output ports 250, that is output ports 250-1 to 250-N. Data arriving at any one of the input ports may be switched to any one of the output ports by connecting the crosspoint 212-1, 212-2 at which an input and an output overlap.

Figure 8:
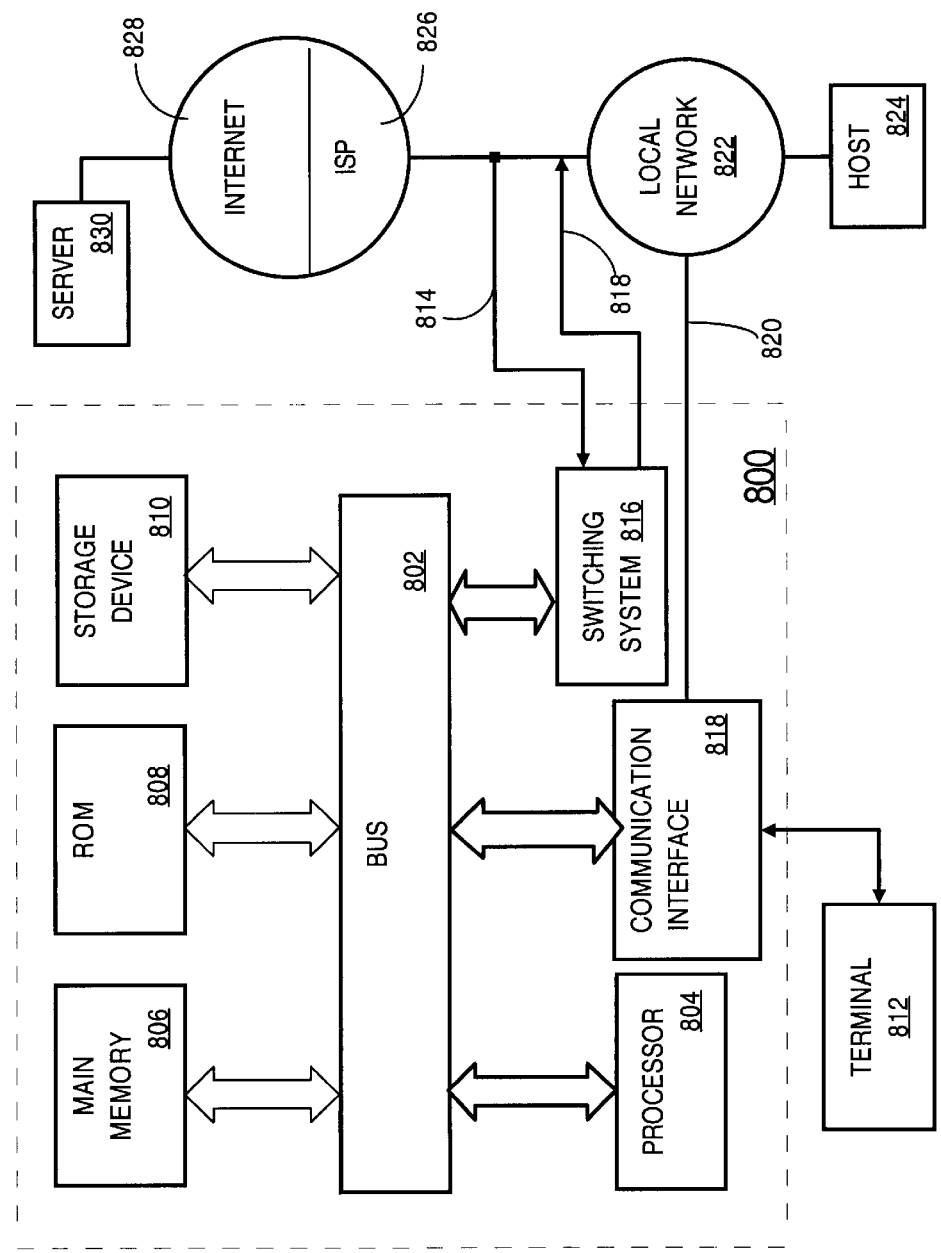
FIG. 8 is a block diagram depicting a computer system upon which an embodiment may be implemented.

Switching device connects crosspoints and carries out other packet processing functions using a processor that operates under control of one or more software elements. FIG. 8, described below, is a block diagram of a processor and related elements that may be used to implement switching device 130. A commercial product suitable for use as switching device 130 is the Model 5300 router commercially available from Cisco Systems, Inc., San Jose, Calif.

TRAFFIC REGULATOR

Referring again to FIG. 2, data arriving on one of the input ports 210 passes through a traffic regulator 260 before arriving at a crosspoint and then passing to one of the output ports 250.

Each traffic regulator 260 is responsible for managing traffic from a particular input port 210 that is associated with that traffic regulator. A traffic regulator receives incoming packets on a particular port, and may transmit each of the received packets to one of output ports 250.

A traffic regulator may be implemented as a separate device that is coupled to the switching device, or as a set of one or more software elements or processes running on one or more processors incorporated into a switching device. A traffic regulator may regulate traffic from any number of input ports to any number of output ports.

Figure 3:
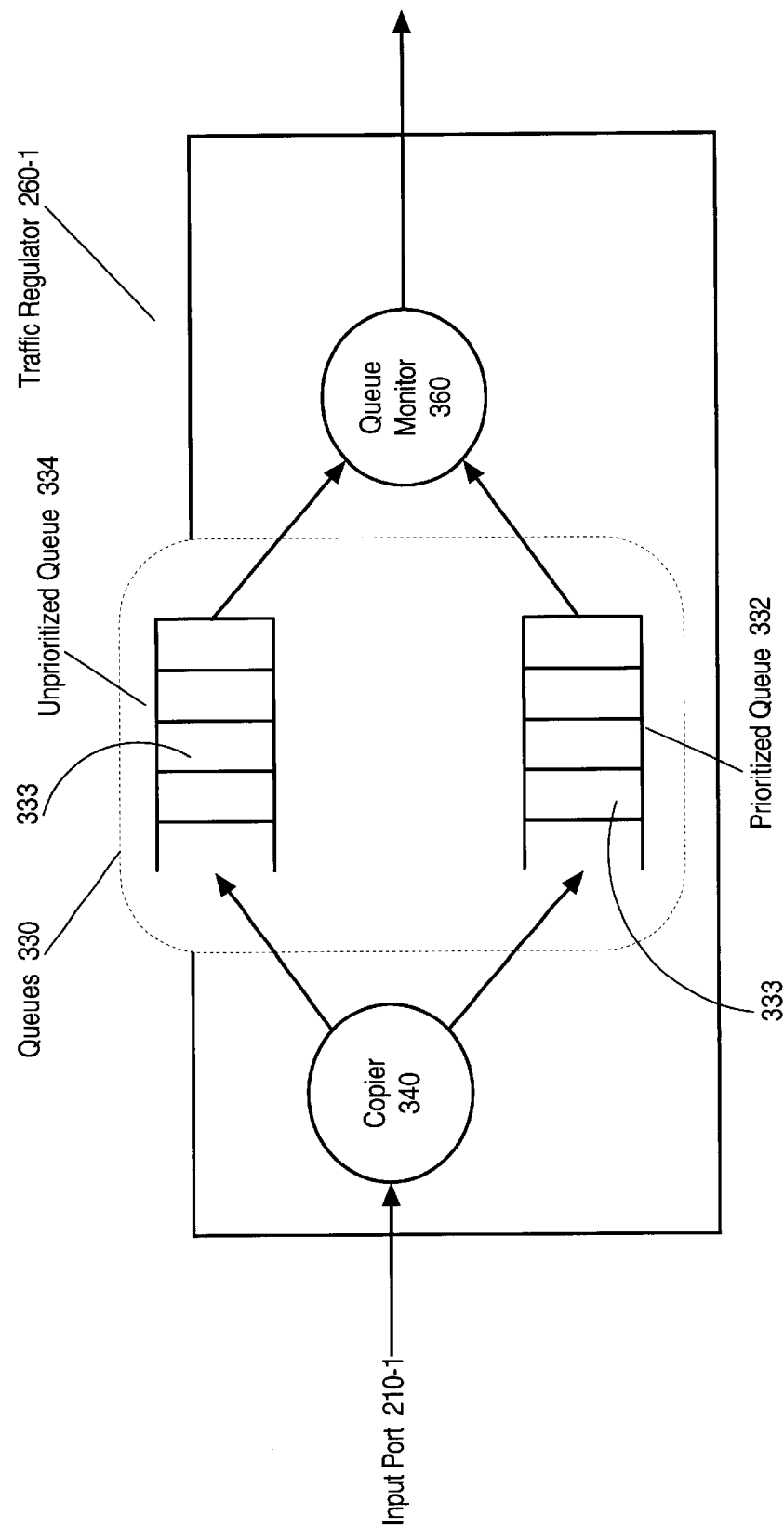
FIG. 3 is an exemplary traffic regulator.

FIG. 3 shows details of an exemplary traffic regulator 260-1, which includes copier 340, queue monitor 360, and queues 330.

Copier 340 copies packets arriving from input port 210-1 to one of the queues 330, based on the traffic class of the packet. Queue monitor 360 monitors and regulates throughput of queues 330. Copier 340 and queue monitor 360 may be programs executed by the same process, or may be different processes running on the same or different processors.

Each of queues 330 stores a class of packets that may be allocated bandwidth according to various algorithms, such as the leaky bucket algorithm. Periodically, a packet in the queues 330 is removed from its queue and transmitted to one of the output ports 250 ("serviced"). Queue monitor 360 schedules packets in queues 330 for servicing in such a way that each traffic class is processed according to the bandwidth allocated to the class.

In addition, queue monitor 360 drops packets from any of queues 330 when queue 330 detects drop conditions. Drop conditions are events that trigger the dropping of packets. An example of a drop condition is the filling up of one of queues 330 when, for example, network 100 is congested. When a packet is dropped, it is not transmitted to an output port 250, and is lost from its transmission.

Queues 330 include a prioritized queue 332 and unprioritized queue 334. Each of the queues 332, 334 comprises a plurality of queue buckets 333. Each queue bucket 333 may store a packet of information that comprises a portion of a stream of network traffic. Each queue 332, 334 operates as a first-in, first-out (FIFO) queue by which packets move from through the queue toward queue monitor 360 and eventually to an output port.

The prioritized queue 332 contains packets of a particular class that are marked. Specifically, the packets in prioritized queue 332 may contain a marking in the form of a drop priority field, and are dropped by queue monitor 360 based on data in the drop priority field. A drop priority field is a data structure within a packet that contains data that indicates when the packet should be dropped relative to other packets stored in a queue. The drop priority field may be included in the Type of Service field in an Internet Protocol (IP) packet.

The unprioritized queue 334 contains a packet that may lack a drop priority field, or that may be treated by a queue manager without respect to a drop priority field contained in a packet.

Generally, prioritized queue 332 is used for real-time traffic that is intolerant to delay, such as packets forming part of voice transmissions or video transmissions. Unprioritized queue 334 generally is used for best effort traffic that is more tolerant to delay or more bursty, such as data transmissions.

MARKING SCHEMES AND DROP POLICIES

As mentioned above, bandwidth partition does not completely eliminate congestion in real-time traffic. To improve the quality of real-time packet streams whose packets are dropped during congestion, transmitters of packets may follow a marking scheme to mark packets. A marking scheme is a process for marking packets by the sender of the packet stream using a set of drop values. A drop value is data stored in a drop priority field that indicates an order to drop a packet relative to other packets in the stream. A drop value set is a set of drop values used to mark packets.

A marking scheme may be used to, for example, uniformly mark packets with drop values, where the numbers of identical drop values in a stream of packets are related according to a predetermined ratio. A marking scheme may be to mark packets sequentially with integer values from "1" to "4", where 25% of the packets are marked with "1", 25% with "2", 25% with "3", and 25% with "4".

Drop values may dictate, to an extent, the distribution of dropped packets dropped by a mechanism that follows a drop policy based on the drop value set. For example, queue monitor 360 may drop packets according to an order or a hierarchy of drop values. That is, packets in a queue marked with a particular drop value are dropped before packets marked by another drop value are dropped. For example, all packets marked "1" might be dropped before the drop mechanism considers dropping packets marked "2" or higher.

A marking scheme may spread out dropped packets throughout a packet stream, and may, for a given range of drop rates, reduce the maximum size of gaps. A gap is a set or sequence of packets that are dropped; the gap size is the number of packets in the sequence of dropped packets.

Limiting the size of gaps improves the quality of certain traffic such as voice or video data. Voice and video packets are highly redundant. Dropped packets can be substantially reconstructed from adjacent packets. By spreading the packets that are likely to be dropped throughout in a packet stream, the maximum size of the gaps may be limited. Accordingly, the quality of service of a voice or video transmission will improve.

EXEMPLARY DROPPING MECHANISM

Figure 4:
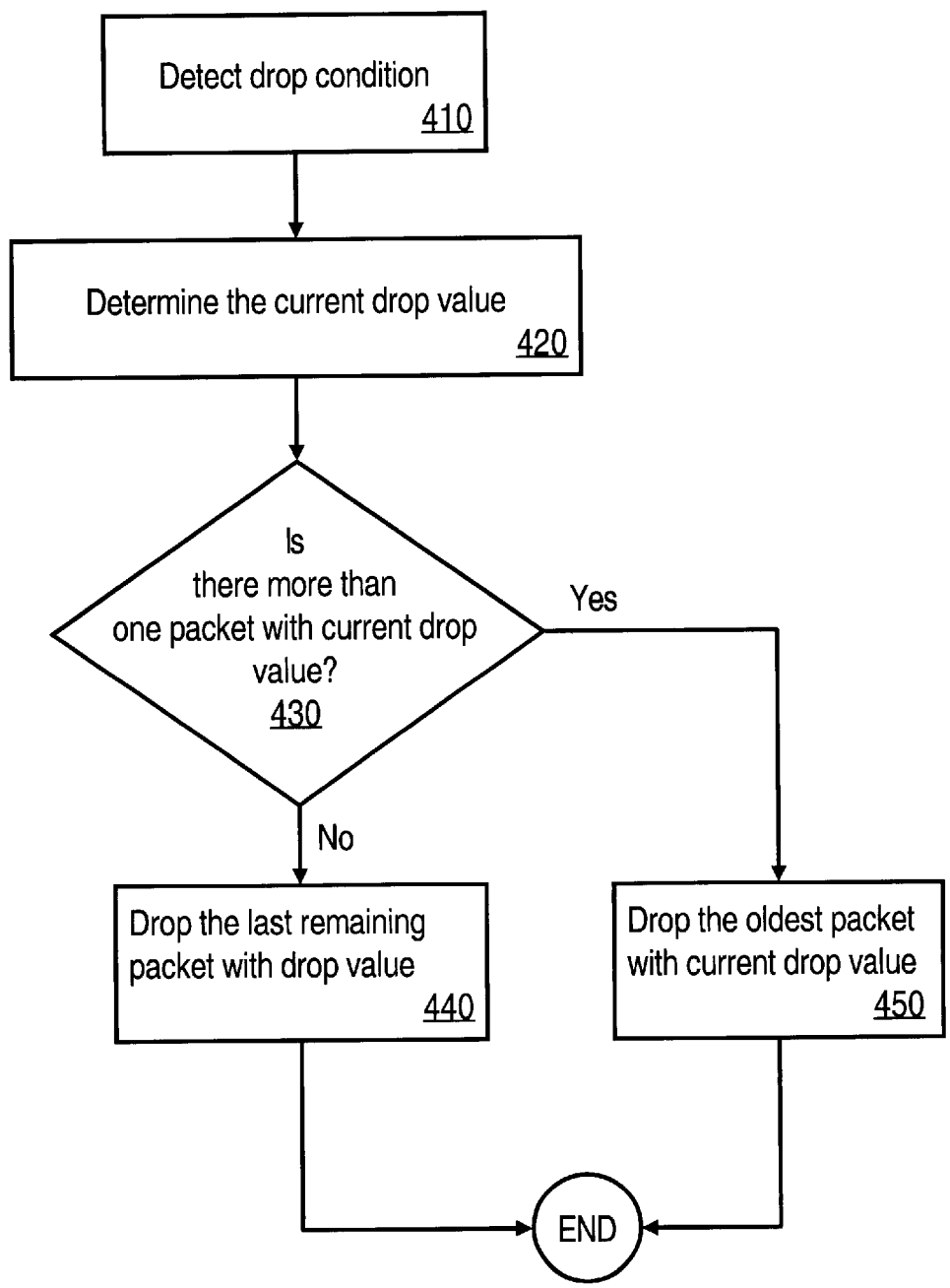
FIG. 4 is a flow chart depicting a process for dropping packets.

FIG. 4 is a block diagram of a process for dropping packets according to drop values in the drop priority fields of packets.

The process depicted in FIG. 4 is illustrated by an example. The example is based on traffic regulator 260-1 shown in FIG. 3, and queues shown in FIG. 5. The process may be used by queue monitor 360 to drop packets in prioritized queue 332.

Figure 5A:
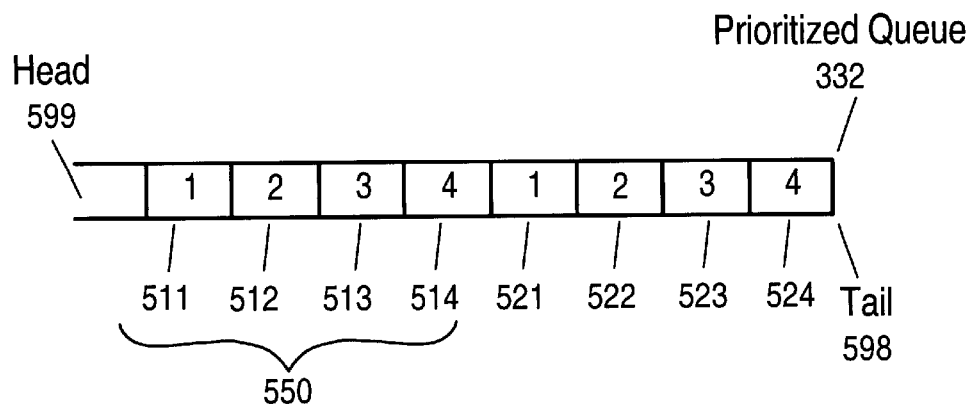
FIG. 5A is a block diagram showing a queue used to illustrate a process for selectively dropping packets.
Figure 5B:
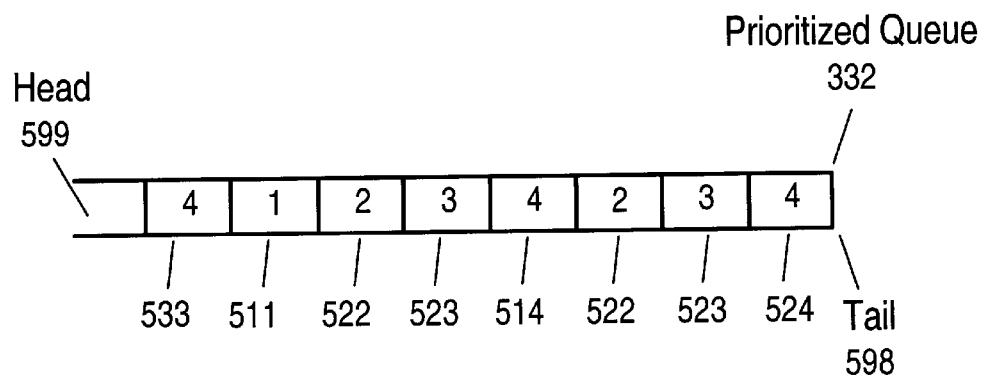
FIG. 5B is a block diagram showing a queue used to illustrate a process for selectively dropping packets.

FIG. 5A and FIG. 5B are block diagrams that depict a particular state of a packet stream in prioritized queue 332, and for each state, depict the drop priority value of each packet in the stream. A queue can have packets from many streams.

For example, packet 524 has a drop priority field value of "4", and packet 514 has a drop priority field value of "4". The older packets, that is, the packets stored the earliest in prioritized queue 332, are positioned toward the head 599 of queue 332. Packet 511 is the oldest packet. The newest packet is at tail 598 of queue 332. Packet 524 is the newest packet.

Referring to FIG. 4, at step 410, a drop condition is detected. In this example, when copier 340 receives a voice packet, copier 340 detects that prioritized queue 332 is full. Copier 340 transmits a message to queue monitor 360 informing queue monitor 360 that a drop condition has been detected. Alternately, queue monitor 360 determines that the prioritized queue 332 is near full according to the RED algorithm. Control then flows to step 420.

At step 420, a current drop value is determined. The current drop value may be the drop value of the next packet to drop. In this example, the next packet to drop is the packet in prioritized queue 332 with the lowest drop priority value. Thus, the current drop value is the lowest drop priority field value of the packets in prioritized queue 332, which is "1". Packets 511 and 521 have drop priority values of "1".

At step 430, the process determines whether there is more than one packet having a drop priority value equal to the current drop value. If so, then control flows to step 440, where the last remaining packet with the current drop value is dropped. Otherwise, control flows to step 450. In this example, there are two packets with a drop priority value equal to the current drop value. Therefore, control flows to step 450.

At step 450, the oldest packet having a drop priority value equal to the current drop value is dropped. In this example, packet 521 sits further toward head 599 of queue 332 than packet 511. Thus, packet 521 is dropped.

Dropping the older packets in a queue may improve the overall delay characteristics of packet streams, especially for real-time traffic, such as video or voice data. To a receiver of such real-time traffic, late packets are often useless and typically ignored. Dropping the oldest packets in a queue improves the "freshness" of arriving data as well as the effective throughput of "usable" data.

FIG. 5B shows the state of prioritized queue 332 at this point of the illustration of the process depicted in FIG. 4. Packet 533, which was the packet just received, is at tail 598 of prioritized queue 332.

Continuing with the current example, at step 420, another drop condition is detected. At step 420, it is determined that the current drop value is "1", which is the drop priority field value of packet 511. At step 430, it determined that there is only one packet with the current drop value. At step 440, packet 511, which is the only packet with a drop priority field value of "1", is dropped.

NON-CONSECUTIVELY ASSIGNED DROP VALUES

A technique for regulating packets by selectively dropping packets has been illustrated based on a marking scheme that uses a set of consecutive values that each occur with equal frequency. However, use of nonconsecutive sequences of values that do not each occur with equal frequency may produce both more uniformly sized gaps and smaller maximum gap sizes at various ranges of drop rates, ensuring higher quality packet streams under more congested network conditions.

In this illustration of such a marking scheme, the following terms will have the following definitions.

A first drop value is the drop value of the first packet to drop in a set of packets marked by every value of a drop value set. For example, the first drop value of packets 511–514 is "1". A first dropped packet is a packet whose drop priority value equals the first drop value.

A last drop value is the drop value of the last packet to drop in set of packets marked by every value of a drop value set. For example, the last drop value of packets 511–514 is "4". A last dropped packet is a packet whose drop priority field value equals the last drop value.

A cycle is a sequence of packets where every drop value of a drop value set is used to mark at least one packet in the set, and that begins, or ends, with the packet having a drop priority field value equal to the last drop value. For example, packets 511–514 form cycle 550.

A cycle length is the number of packets in a cycle. Thus, the cycle length of cycle 550 is "4".

Packet streams having last dropped packets that occur uniformly and less frequently than packets with other drop values, and where the first drop values occur uniformly and more frequently than other drop values, may create lower maximum gap sizes at higher drop rates, as a consequence, higher quality real-time data streams are transmitted under more congested network conditions.

FIG. 6A, FIG. 6B, FIG. 6C, FIG. 7A, FIG. 7B, and FIG. 7C are block diagrams depicting a packet stream 610 and a packet stream 710, respectively, in various states.

Each state illustrates how lower maximum gap sizes may be created by increasing cycle length, and by uniformly marking a packet stream with proportionally more first drop values and less last drop values. For both packet streams 610 and 710, the first drop value is "1", and the last drop value is "4". In this illustration, for packet stream 610, 50% of the packets are marked by "1", 25% are marked by the value "2", 12.5% are marked by "3", and 12.5% are marked by "4". For packet stream 710, equal quarter portions are marked by the integer value "1", "2", "3", and "4" respectively.

Figure 6A:
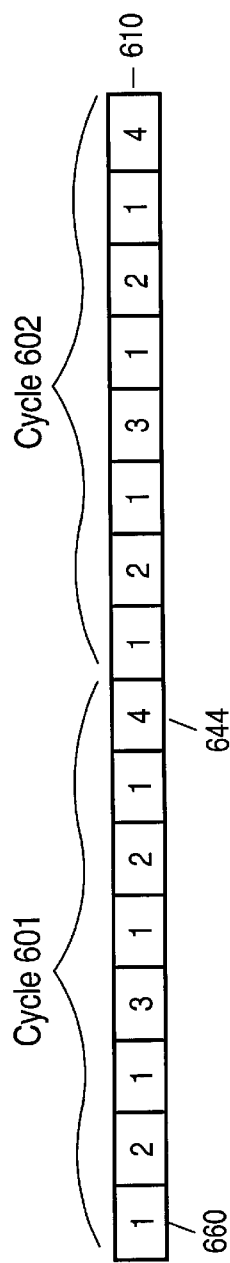
FIG. 6A is a block diagram showing a packet stream used to illustrate a marking scheme.

FIG. 6A is a block diagram depicting packet stream 610 before any of its packets are dropped by application of the exemplary drop process depicted by FIG. 4. For each packet in packet stream 610, FIG. 6A shows the drop value used to mark the packet. For example, packet 644 is marked by the drop value "4". Packet stream 610 includes cycle 601 and 602.

FIG. 7A is a block diagram depicting packet stream 710 before any of its packets are dropped by application of the exemplary drop process. For each packet in packet stream 710, FIG. 7A shows drop values used to mark the packet. For example, packet 714 is marked by the drop value "4". Packet stream 710 includes cycle 701, 702, 703, and 704.

Figure 6B:
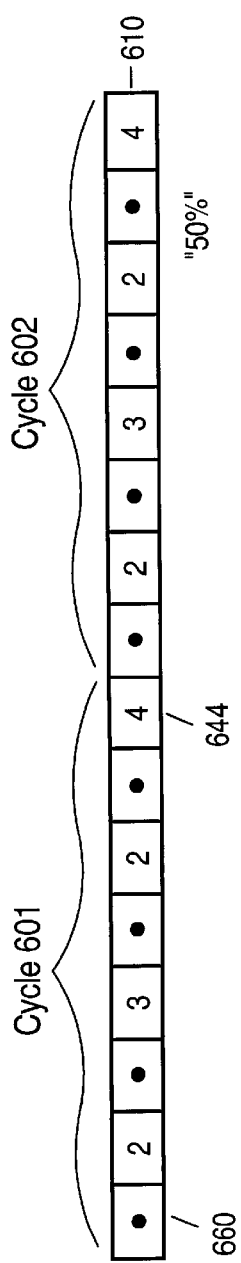
FIG. 6B is a block diagram showing a packet stream used to illustrate a marking scheme.

FIG. 6B and FIG. 7B illustrate a drop rate of 50%. For packets in packet stream 610, the maximum cycle length is 1, while the maximum gap size for packet stream 710 is 2.

Figure 6C:
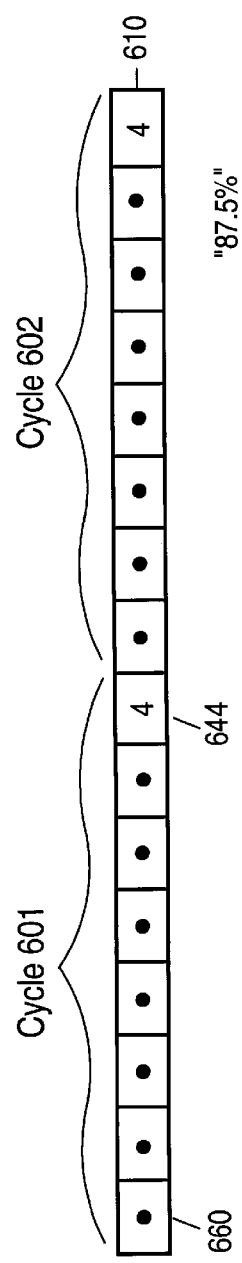
FIG. 6C is a block diagram showing a packet stream used to illustrate a marking scheme.

FIG. 6C and FIG. 7C illustrate a drop rate of 87.5%. For packet stream 610, the maximum gap size is 7, while for packet stream 710 the maximum gap length may be 11.

As shown in the above examples, using a constant number of drop values, such as 4, the non-consecutive, non-equal frequency scheme yields more uniform drops and shorter maximum gaps. In general, if there are n drop values being used, this scheme will generate a sequence with cycle length of $2^n$. In each cycle, the frequency of the lowest drop value is ½ (50%), the frequency of the next lowest drop value is ¼, and the frequency of the $k^{th}$ lowest drop value is $½^k$, except that the highest drop value ($n^{th}$ lowest) will take whatever slots remain in the cycle (i.e. $½^{n-1}$ instead of $½^n$).

MULTIPLE QUEUES FOR CLASSES OF PACKETS

To further optimize throughput, more than one prioritized or non-prioritized queue may be used. Packets of a particular type would be placed in a particular queue. For example, copier 340 may copy video to one prioritized queue and voice data to another prioritized queue. Queue monitor 360 may allocate bandwidth between the prioritized queues, employing various techniques to optimize throughput. By further partitioning the bandwidth, we can isolate the negative impacts caused to the network by ill-behave streams.

For example, some originators of packets may mark their packets only with drop values that are least likely to lead to dropping, deliberately ignoring an agreed upon marking scheme. For example, all packets in a packet stream may be marked with the last drop value. This technique ("fixing the race") enhances the throughput of the fixed packet stream, while damaging the throughput of other packet streams that follow the agreed upon marking scheme. These "fixed" packet streams may be placed in another prioritized queue, to protect packet streams which do follow the agreed-upon marking scheme.

For example, assume that in contravention of an agreed-upon marking scheme, a Doe voice service marks all its packets with a last drop value, to give its packets an advantage over other sources of voice data that do not follow the marking scheme. Copier 340 could be configured to detect packets which do not follow the agreed-upon marking scheme. In response to detecting such packets, copier 340 creates a separate prioritized queue for packets from Doe, and stores them in the prioritized queue.

HARDWARE OVERVIEW

FIG. 8 is a block diagram that illustrates a computer system 800 upon which an embodiment of the invention may be implemented. In one embodiment, computer system 800 is a network switching device, such as a router.

Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as non-volatile random-access memory (NVRAM), is provided and coupled to bus 802 for storing information and instructions.

Computer system 800 may be coupled via communication interface 718 to a terminal 812, such as a cathode ray tube (CRT) dumb terminal or workstation, for receiving command-line instructions from and displaying information to a computer user. Terminal 812 includes an input device such as a keyboard, and may include a cursor control such as a mouse, a trackball, or cursor direction keys for communicating direction information and command selections to processor 804.

Computer system 800 has a switching system 816 which provides a plurality of links or interfaces to a network 722. In one embodiment, switching system 816 is a crossbar mechanism of the type illustrated in FIG. 2. Switching system 816 provides a way to connect an incoming network link 814 to an outgoing network link 818. There may be many links 814, 816.

The invention is related to the use of computer system 800 for regulating packet traffic in an integrated services network. According to one embodiment of the invention, regulating packet traffic in an integrated services network is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, NVRAM, such as storage device 810, or magnetic or optical disks. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for regulating packet traffic in an integrated services network as described herein.

The received code may be executed by processor 804 as it is received, and/or stored in storage device 810, or other non-volatile storage for later execution. In this manner, computer system 800 may obtain application code in the form of a carrier wave.

ADVANTAGES; SCOPE OF DISCLOSURE

The methods and mechanisms described above offer several distinct advantages over prior approaches.

They provide a method to carry voice traffic over existing data networks without major changes to network infrastructure or applications. There is minimal need to modify existing data network protocols.

The methods and mechanisms are highly robust. Subsystems are isolated from malfunctions of other subsystems. Bandwidth partitions are reserved for, but not dedicated to, each type of traffic. Unused partitions may be used by other traffic and may be reclaimed when needed at any time.

The use of the new dropping mechanism optimizes the service quality of real-time traffic and allows the quality to degrade gradually in the event of network congestion.

The regulatory devices can be added gradually to an existing network as stand-alone devices, or can form integrated parts of new network switching devices.

The design is simple and results in minimum performance overhead.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing traffic directed from a first network element to a second network element in a packet-switched network, comprising the steps of:
   receiving, from the first network element, a plurality of packets each including a drop priority value in a drop priority field that indicates an order to drop the packet relative to other packets among the plurality of packets;
   storing the plurality of packets in a queue;
   detecting a drop condition, and in response thereto:
      from among packets in the queue, selecting one or more packets based on the drop priority value in the drop priority field of each of said packets in the queue, and dropping the selected packets from the queue while transmitting to the second network element other packets of said plurality of packets;
   wherein the step of receiving includes receiving a plurality of packets that includes a first subset of packets that each include a drop priority field set to a first drop priority value of a set of drop priority values and a second subset of packets that each include a drop priority field set to a second drop priority value of said set of drop priority values; and
   wherein the step of selecting includes selecting all packets from said first subset before selecting packets from said second subset.

2. A method as recited in claim 1, wherein the step of selecting includes selecting a first packet that is received after at least one other packet from said plurality of packets.

3. A method as recited in claim 1, wherein the step of receiving a plurality of packets includes assigning the first drop priority values and the second drop priority values according to a pre-determined ratio.

4. A method as recited in claim 1, wherein the step of receiving includes receiving a plurality of packets each having drop priority field values that form a sequence of consecutively greater integers.

5. A method as recited in claim 1, wherein the step of selecting one or more packets comprises selecting only an earlier received packet that has a particular drop priority field value.

6. A method as recited in claim 1, wherein the step of storing includes storing said plurality of packets in a first set of one or more first queues, and further comprising the step of storing a second plurality of packets in a second set of one or more second queues.

7. A method as recited in claim 1, wherein the step of storing includes storing said plurality of packets either in a first set of one or more first queues, or in a second plurality of packets in a second set of one or more second queues, according to a type of traffic represented by the plurality of packets.

8. A method as recited in claim 7, wherein the step of storing includes the steps of:
   storing said plurality of packets in a queue selected from among a plurality of queues according to a type of data contained in each packet of said plurality of packets; and
   storing packets containing voice traffic in a first queue of the plurality of queues and storing data traffic in a second queue of the plurality of queues.

9. A method as recited in claim 1, wherein the step of storing includes storing said plurality of packets in a queue selected from among a plurality of queues according to a type of data contained in each packet of said plurality of packets.

10. A network traffic apparatus, the network traffic apparatus configured to perform the steps of:
    receiving a plurality of packets each containing a drop priority field that contains a drop value indicating an order in which to drop that packet relative to other packets;
    wherein the drop priority field of a first subset of packets of the plurality of packets stores a first drop value from a set of values that includes a second drop value;
    wherein the drop priority field of a second subset of packets stores said second value, wherein the ratio of the number packets in the first subset to the number of packets in the second subset is substantially equal to a predetermined ratio; and
    in response to detection of network congestion, selectively dropping one or more packets according to the drop value of each of the packets.

11. A method of managing transmission of packets of network traffic from a first network element to a second network element, the method comprising the steps of:
    generating a plurality of packets each containing a drop priority field;
    storing, in the drop priority field of each of the packets, a drop priority value that indicates an order in which to drop that packet relative to other packets;
    in response to detection of network congestion, selectively dropping one or more packets according to the drop priority value of each of the packets, while transmitting the other packets of said plurality of packets from the first network element to the second network element;
    storing in the drop priority field of each packet of a first subset of packets a first drop priority value from a set of values that includes a second drop priority value; and
    storing the second value in the drop priority field of each packet of a second subset of packets, wherein the ratio of the number packets in the first subset to the number of packets in the second subset is substantially equal to a predetermined ratio.

12. A method of managing packet based network traffic, the method comprising the steps of:
    a first network device generating a plurality of packets that includes a first subset of packets that each include a drop priority field set to a first drop priority value of a set of drop priority values that indicate an order in which to drop said packet relative to other packets of said plurality of packets and
    a second subset of packets from said plurality of packets that each include a drop priority field set to a second value of the set of drop priority values;
    the first network device transmitting said plurality of packets to a second network device;
    the second network device receiving said plurality of packets;
    the second network device storing said plurality of packets;
    detecting a drop condition;
    in response to detecting said drop condition:
       selecting one or more of said plurality of packets based on the order indicated by the drop priority values in the drop priority field of each of said plurality of packets, and
       dropping said one or more plurality of packets while transmitting the other packets of said plurality of packets from the second network element to another network element;

wherein the step of receiving includes receiving a plurality of packets that includes a first subset of packets that each include a drop priority field set to a first drop priority value of a set of drop priority values and a second subset of packets that each include a drop priority field set to a second drop priority value of said set of drop priority values; and wherein the step of selecting includes selecting all packets from said first subset before selecting packets from said second subset.

13. A network traffic regulation apparatus, comprising:

an input port coupled to a packet-switched network and receiving network traffic therefrom;

a first queue and a second queue coupled to the input port, each queue comprising a plurality of queue buckets that may receive a packet of the network traffic, each packet including a type value that identifies a type of transmission represented by the packet, each packet including a drop priority value in a drop priority field that indicates an order to drop the packet relative to other packets;

a copier that selectively copies the network traffic to the first queue or to the second queue based on the type value of the packet;

wherein a particular queue of said first queue and said second queue includes a first subset of packets that each include a drop priority field set to a first drop priority value of a set of drop priority values and a second subset of packets that each include a drop priority field set to a second drop priority value of said set of drop priority values; and a queue monitor that:
  monitors available storage in the first queue and the second queue, and
  from among the packets in the particular queue, selectively drops packets from the particular queue according to their drop priority values when a network congestion condition is identified by selectively dropping all packets from said first subset before selectively dropping packets from said second subset.

14. A network traffic regulation apparatus as recited in claim 13, wherein the first queue is reserved for non-priority network traffic and the second queue is reserved for priority network traffic, and wherein the copier copies data type packets only to the first queue and copies voice type packets only to the second queue.

15. A network traffic regulation apparatus as recited in claim 13, wherein the first queue is reserved for network traffic requiring guaranteed bandwidth availability and the second queue is reserved for network traffic requiring guaranteed minimum transmission delay.

16. A network traffic regulation apparatus as recited in claim 13, wherein the first queue is reserved for network traffic requiring guaranteed bandwidth availability and the second queue is reserved for network traffic requiring guaranteed minimum transmission delay, and wherein the copier copies data type packets only to the first queue and copies voice type packets only to the second queue.

17. A network traffic regulation apparatus as recited in claim 13, wherein the first queue is reserved for network traffic requiring guaranteed bandwidth availability and the second queue is reserved for network traffic requiring guaranteed minimum transmission delay;

wherein the copier copies data type packets only to the first queue and copies voice type packets only to the second queue;

wherein the queue monitor monitors available storage in the first queue and the second queue;

wherein the queue monitor selectively drops packets from the first queue only according to their drop priority values when a network congestion condition is identified; and wherein the queue monitor selectively drops packets from the second queue only based on a Rapid Early Detection ("RED") mechanism.

18. A network traffic regulation apparatus as recited in claim 13, wherein the queue monitor selectively drops packets from the first queue only according to their drop priority values when a network congestion condition is identified; and wherein the queue monitor selectively drops packets from the second queue only based on a Rapid Early Detection ("RED") mechanism.

19. A network traffic regulation apparatus as recited in claim 13, wherein the queue monitor selectively drops packets from the queues according to their drop priority values when a network congestion condition is identified by carrying out the steps of:

detecting the network congestion condition;

determining a current drop priority value; and determining whether the first queue contains more than one packet having the current drop priority value, and if so, dropping the oldest packet in the first queue having the current drop priority value.

20. A network traffic regulation apparatus as recited in claim 13, wherein the queue monitor selectively drops packets from the queues according to their drop priority values when a network congestion condition is identified by carrying out the steps of:

detecting the network congestion condition;

determining a current drop priority value; and determining whether the first queue contains more than one packet having the current drop priority value, and if not, dropping the last remaining packet in the first queue having the current drop priority value.

21. A switching apparatus for packet-switched networks, comprising:

a plurality of input ports each coupled to a packet-switched network to receive network traffic therefrom and coupled to associated input lines;

a plurality of output ports each directed to other network elements and which may be selectively logically coupled to one of the input ports at a crosspoint therewith;

a traffic regulator module logically coupled between each input port and each input line, the traffic regulator module comprising:

a first queue and a second queue, each queue comprising a plurality of queue buckets that may receive a packet of the network traffic, each packet including a type value that identifies a type of transmission represented by the packet, each packet including a drop priority value in a drop priority field that indicates an order to drop the packet relative to other packets among the plurality of packets;

a copier that selectively copies the network traffic to the first queue or to the second queue based on the type value of the packet;

wherein a particular queue of said first queue and said second queue includes a first subset of packets that each include a drop priority field set to a first drop priority value of a set of drop priority values and a second subset of packets that each include a drop priority field set to a second drop priority value of said set of drop priority values; and a queue monitor that:

monitors available storage in the first queue and the second queue, and from among the packets in the particular queue, selectively drops packets from the particular queue according to their drop priority values when a network congestion condition is identified by selectively dropping all packets from said first subset before selectively dropping packets from said second subset.

22. A computer-readable medium carrying one or more sequences of instructions for managing traffic directed from a first network element to a second network element in a packet-switched network, wherein execution of the one or more sequences of instructions by one or more processors causes the one or more processors to perform the steps of:

receiving, from the first network element, a plurality of packets each including a drop priority value in a drop priority field that indicates an order to drop the packet relative to other packets among the plurality of packets;

storing the plurality of packets in a queue;

detecting a drop condition, and in response thereto:

from among packets in the queue, selecting one or more packets based on the drop priority value in the drop priority field of each of said packets in the queue, and dropping the selected packets from the queue while transmitting to the second network element other packets of said plurality of packets;

wherein the step of receiving includes receiving a plurality of packets that includes a first subset of packets that each include a drop priority field set to a first drop priority value of a set of drop priority values and a second subset of packets that each include a drop priority field set to a second drop priority value of said set of drop priority values; and wherein the step of selecting includes selecting all packets from said first subset before selecting packets from said second subset.

23. A computer-readable medium as recited in claim 22, wherein the step of selecting includes selecting a first packet that is received after at least one other packet from said plurality of packets.

24. A computer-readable medium as recited in claim 22, wherein the step of receiving a plurality of packets includes assigning the first drop priority values and the second drop priority values according to a pre-determined ratio.

25. A computer-readable medium as recited in claim 22, wherein the step of receiving includes receiving a plurality of packets each having drop priority field values that form a sequence of consecutively greater integers.

26. A computer-readable medium as recited in claim 22, wherein the step of selecting one or more packets comprises selecting only an earlier received packet that has a particular drop priority field value.

27. A computer-readable medium as recited in claim 22, wherein the step of storing includes storing said plurality of packets in a first set of one or more first queues, and further comprising the step of storing a second plurality of packets in a second set of one or more second queues.

28. A computer-readable medium as recited in claim 22, wherein the step of storing includes storing said plurality of packets either in a first set of one or more first queues, or in a second plurality of packets in a second set of one or more second queues, according to a type of traffic represented by the plurality of packets.

29. A computer-readable medium as recited in claim 28, wherein the step of storing includes the steps of:

storing said plurality of packets in a queue selected from among a plurality of queues according to a type of data contained in each packet of said plurality of packets; and storing packets containing voice traffic in a first queue of the plurality of queues and storing data traffic in a second queue of the plurality of queues.

30. A computer-readable medium as recited in claim 22, wherein the step of storing includes storing said plurality of packets in a queue selected from among a plurality of queues according to a type of data contained in each packet of said plurality of packets.

31. A computer-readable medium carrying one or more sequences of instructions for managing traffic directed from a first network element to a second network element in a packet-switched network, wherein execution of the one or more sequences of instructions by one or more processors causes the one or more processors to perform the steps of:

receiving network traffic from a packet-switched network;

creating and storing a first queue and a second queue, each queue comprising a plurality of queue buckets that may receive a packet of the network traffic, each packet including a type value that identifies a type of transmission represented by the packet, each packet including a drop priority value in a drop priority field that indicates an order to drop the packet relative to other packets;

selectively copying the network traffic to the first queue or to the second queue based on the type value of the packet;

monitoring available storage in the first queue and the second queue;

from among the packets in a particular queue of said first queue and said second queue, selectively dropping packets from the particular queue according to their drop priority values when a network congestion condition is identified;

wherein the particular queue of said first queue and said second queue includes a first subset of packets that each include a drop priority field set to a first drop priority value of a set of drop priority values and a second subset of packets that each include a drop priority field set to a second drop priority value of said set of drop priority values; and wherein the step of selectively dropping packets includes selecting all packets from said first subset before selecting packets from said second subset.

32. A computer-readable medium as recited in claim 31, further comprising the steps of:

reserving the first queue for non-priority network traffic;

reserving the second queue is for priority network traffic; and copying data type packets only to the first queue and copies voice type packets only to the second queue.

33. A computer-readable medium as recited in claim 31, further comprising the steps of:
  reserving the first queue for network traffic requiring guaranteed bandwidth availability and
  reserving the second queue for network traffic requiring guaranteed minimum transmission delay.

34. A computer-readable medium as recited in claim 31, further comprising the steps of:
  reserving the first queue for network traffic requiring guaranteed bandwidth availability;
  reserving the second queue for network traffic requiring guaranteed minimum transmission delay; and
  copying data type packets only to the first queue and copies voice type packets only to the second queue.

35. A computer-readable medium as recited in claim 31, further comprising the steps of:
  reserving the first queue for network traffic requiring guaranteed bandwidth availability and reserving the second queue for network traffic requiring guaranteed minimum transmission delay;
  copying data type packets only to the first queue and copies voice type packets only to the second queue;
  monitoring available storage in the first queue and the second queue;
  selectively dropping packets from the first queue only according to their drop priority values when a network congestion condition is identified; and
  selectively dropping packets from the second queue only based on a Rapid Early Detection ("RED") mechanism.

36. A computer-readable medium as recited in claim 31, further comprising the steps of:
  selectively dropping packets from the first queue only according to their drop priority values when a network congestion condition is identified; and
  selectively dropping packets from the second queue only based on a Rapid Early Detection ("RED") mechanism.

37. A computer-readable medium as recited in claim 31, further comprising the steps of:
  selectively dropping packets from the queues according to their drop priority values when a network congestion condition is identified by carrying out the steps of:
    detecting the network congestion condition;
    determining a current drop priority value; and
    determining whether the first queue contains more than one packet having the current drop priority value, and if so, dropping the oldest packet in the first queue having the current drop priority value.

38. A computer-readable medium as recited in claim 31, further comprising the steps of:
  selectively dropping packets from the queues according to their drop priority values when a network congestion condition is identified by carrying out the steps of:
    detecting the network congestion condition;
    determining a current drop priority value; and
    determining whether the first queue contains more than one packet having the current drop priority value, and if not, dropping the last remaining packet in the first queue having the current drop priority value.

39. A method of managing transmission of packets over a network, the method comprising the steps of:
  generating a plurality of packets each containing a drop priority field;
  storing, in the drop priority field of each of the packets, a drop value that indicates an order in which to drop that packet relative to other packets;
  storing in the drop priority field of each packet of a first subset of packets of the plurality of packets a first drop value from a set of values that includes a second drop value;
  storing the second value in the drop priority field of each packet of a second subset of packets, wherein the ratio of the number packets in the first subset to the number of packets in the second subset is substantially equal to a predetermined ratio; and
  transmitting over a network to a network element said plurality of packets, wherein the step of transmitting causes said network element to selectively drop one or more packets according to the drop value of each of the packets in response to detection of network congestion.

40. The method of claim 39, wherein the step of transmitting causes said network element to selectively drop one or more packets by performing one or more steps that include selecting all packets from said first subset before selecting packets from said second subset.

41. A computer-readable medium carrying one or more sequences of instructions for managing transmission of packets over a network, wherein execution of the one or more sequences of instructions by one or more processors causes the one or more processors to perform the steps of:
  generating a plurality of packets each containing a drop priority field;
  storing, in the drop priority field of each of the packets, a drop value that indicates an order in which to drop that packet relative to other packets;
  storing in the drop priority field of each packet of a first subset of packets of the plurality of packets a first drop value from a set of values that includes a second drop value;
  storing the second value in the drop priority field of each packet of a second subset of packets, wherein the ratio of the number packets in the first subset to the number of packets in the second subset is substantially equal to a predetermined ratio; and
  transmitting over a network to a network element said plurality of packets, wherein the step of transmitting causes said network element to selectively drop one or more packets according to the drop value of each of the packets in response to detection of network congestion.

42. The computer-readable medium of claim 41, wherein the step of transmitting causes said network element to selectively drop one or more packets by performing steps that include selecting all packets from said first subset before selecting packets from said second subset.

* * * * *